US 6,557,948 B2

(12) United States Patent
Greaves

(10) Patent No.: US 6,557,948 B2
(45) Date of Patent: May 6, 2003

(54) BRAKING APPARATUS FOR A VEHICLE

(76) Inventor: John Greaves, 190 Wilson Blvd., N., Naples, FL (US) 34120-2073

( * ) Notice: Subject to any disclaimer, the term of this patent is extended or adjusted under 35 U.S.C. 154(b) by 0 days.

(21) Appl. No.: 09/943,363

(22) Filed: Aug. 30, 2001

(65) Prior Publication Data

US 2002/0030401 A1 Mar. 14, 2002

Related U.S. Application Data

(63) Continuation-in-part of application No. 09/347,698, filed on Jul. 3, 1999, now abandoned, which is a continuation-in-part of application No. 09/071,400, filed on May 1, 1998, now Pat. No. 6,152,544.
(60) Provisional application No. 60/068,133, filed on Dec. 15, 1997, and provisional application No. 60/245,128, filed on Nov. 2, 2000.

(51) Int. Cl.[7] .............................................. B60T 13/00
(52) U.S. Cl. ...................................... 303/7; 188/112 R
(58) Field of Search ........................ 188/112 R, 112 A, 188/356, 357, 345; 303/7

(56) References Cited

U.S. PATENT DOCUMENTS

| 2,064,612 | A | * | 12/1936 | Kliesrath et al. | ....... 188/112 R |
|---|---|---|---|---|---|
| 3,790,807 | A | * | 2/1974 | Rossigno | ........................ 303/7 |
| 3,983,787 | A | * | 10/1976 | Hendrickson | ................... 303/7 |
| 5,031,729 | A | * | 7/1991 | Wittkop et al. | ......... 188/112 R |
| 5,213,396 | A | * | 5/1993 | Avery et al. | .................... 303/7 |
| 5,411,321 | A | * | 5/1995 | Harness | ......................... 303/7 |
| 5,431,253 | A | * | 7/1995 | Hargrove | ................ 188/112 R |
| 5,465,813 | A | * | 11/1995 | Lichter | ........................... 303/7 |
| 6,050,649 | A | * | 4/2000 | Hensley | ......................... 303/7 |
| 6,152,544 | A | * | 11/2000 | Greaves, Jr. | ................... 383/7 |

* cited by examiner

Primary Examiner—Matthew C. Graham
(74) Attorney, Agent, or Firm—Eric Karich

(57) ABSTRACT

A braking apparatus used to brake a vehicle has a brake actuator that actuates at least one brake of the vehicle through a cable that mechanically interconnects the brake actuator to the brake pedal of the vehicle through a cable shield tube that is anchored to a first anchor point and a second anchor point. The first anchor point is separated a fixed distance from the brake actuator by a base plate, and the second attachment point is separated a fixed distance from the brake pedal by attaching the second attachment point to a firewall of the vehicle.

9 Claims, 13 Drawing Sheets

BRAKING APPARATUS FOR A VEHICLE

This application for a utility patent is a continuation-in-part of a previously filed utility patent application Ser. No. 09/347,698, filed Jul. 3, 1999, now abandoned, which was a continuation-in-part of patent application Ser. No. 09/071,400, filed May. 1, 1998, now issued as U.S. Pat. No. 6,152,544. All three applications claim the priority of U.S. Provisional Application No. 60/068,133, filed Dec. 15, 1997, and U.S. Provisional Application No. 60/245,128, filed Nov. 2, 2000.

BACKGROUND OF THE INVENTION

1. Field of the Invention

This invention relates generally to a braking apparatus of a vehicle, and more particularly to a braking apparatus that includes a cable and cable shield tube that together enable a brake actuator to actuate a brake pedal from anywhere in the vehicle.

2. Description of Related Art

The following references describe the state of the art in the field of supplementary braking systems: Hargrove, U.S. Pat. No. 5,431,253 describes a braking system for use on a towing vehicle and on a towed vehicle comprises a vacuum capture mechanism for capturing vacuum from a towing vehicle. A vacuum delivery mechanism is provided for delivering vacuum to a towed vehicle. A switch mechanism is also provided for allowing controlled transfer of vacuum to a towed vehicle. A vacuum reception mechanism is coupleable with the vacuum delivery mechanism for receipt of vacuum. An air pressure mechanism is adapted to be coupled to a towed vehicle for generating air pressure when actuated. A ram mechanism is coupled to the air pressure mechanism for depressing a brake pedal of a towed vehicle when the air pressure mechanism is actuated. A vacuum switch mechanism is coupled to the vacuum reception mechanism. The vacuum switch mechanism has one orientation for actuating the air pressure mechanism upon receipt of vacuum. A check valve switch mechanism is coupled to the vacuum switch mechanism and adapted to be coupled to a brake vacuum system of a towed vehicle for receipt of vacuum therefrom.

Wittkop et al., U.S. Pat. No. 5,031,729 describes a braking apparatus that applies the brakes of a towed vehicle in response to braking of the towing vehicle. An air compressor driven by the motor of the towing vehicle supplies compressed air to a compressed air storage tank with a pneumatic line extending from the compressed air storage tank rearwardly to a braking assembly which is positioned in the passenger compartment of the towed vehicle. The braking assembly is adjustable and includes a rod positioned between the steering wheel and the brake pedal of the towed vehicle and is secured to both. A pneumatic control device is connected to the pneumatic line to receive a signal therethrough to actuate the braking assembly through an actuation device such as a pneumatic piston to exert pressure to expand the length of the bar and apply the brakes of the towed vehicle. An air release valve in the bar assembly can exhaust air from the pneumatic piston responsive to cessation of compressed air being supplied through the pneumatic line to facilitate immediate release of the brakes of the towed vehicle.

Rossigno, U.S. Pat. No. 3,790,807 describes a solenoid operated control valve for establishing an operational pressure differential in a servomotor located in a trailer to activate the wheel brakes of the trailer in response to an operational electrical signal derived from corresponding hydraulic actuation of the wheel brakes of a tow vehicle.

Lichter, U.S. Pat. No. 5,465,813 describes a device for applying the brake of a towed vehicle when towed by a towing vehicle equipped with an air brake system having a power brake operator operative to supply operating air under pressure to apply a brake on the towing vehicle and also having a reservoir of operating air under pressure. The device is connected to the brake pedal of the towed vehicle. It comprises a first piston-cylinder assembly with a spring for urging the piston therein to an advanced position, and a second piston-cylinder assembly having a spring urging the piston therein to a retracted position. The brake on the towed vehicle is applied only when one of the pistons is advanced. An air line supplies air from the reservoir to the first piston-cylinder assembly to urge the piston to a retracted position against the action of the spring. The brake of the towed vehicle is applied when the piston in the first piston-cylinder assembly is moved to an advanced position by the spring therein in response to a loss of pressure in the reservoir. The brake of the towed vehicle is also applied when the piston in the second piston-cylinder assembly is moved against the spring force to its advanced position by operating air under pressure from the power brake operator when the power brake operator applies the brakes of the towing vehicle.

Avery et al., U.S. Pat. No. 5,213,396 describes a towed motor vehicle brake integrated between a towing and a towed vehicle, capable of applying the brakes of the towed vehicle. The structure of a towing hitch linkage deflects somewhat when it experiences tension or compression. A sensing device, preferably consisting of a hydraulic cylinder and an attached activating rod, grounded to a rotating lever connecting to the towed vehicle, senses compression of the deflecting portion of the linkage and activates the brakes of the towed in vehicle to reduce the compressive forces. The tow brake requires no modification of the towed vehicle except allowing an interface with the towed vehicle's braking system. This provides flexibility of use with a variety of towed vehicles and ease of attachment and detachment.

Harness, U.S. Pat. No. 5,411,321 describes a system for selectively applying the brakes of a towed vehicle by controls in the towing vehicle; the system including a portable air compressor and a pneumatic cylinder that can be rapidly installed by attaching to a support structure on the floor of the driver's cockpit in the towed vehicle; the piston of the cylinder being attached to the brake pedal; and a three-way solenoid valve to permit or not to permit the admission of compressed air to the cylinder.

The prior art teaches braking devices that actuate a brake pedal of a towed vehicle in response to a signal from a towing vehicle. However, the prior art does not teach a cable connection that enables a brake actuator to actuate the brake pedal from any location within the towed vehicle. The present invention fulfills these needs and provides further related advantages as described in the following summary.

SUMMARY OF THE INVENTION

The present invention teaches certain benefits in construction and use which give rise to the objectives described below.

The present invention provides a braking apparatus used to brake a vehicle. The braking apparatus includes a brake actuator that actuates at least one brake of the vehicle through a means for operably connecting the brake actuator to a vacuum power booster to operatively control at least one brake of the vehicle. The connecting means is preferably a cable that mechanically interconnects the brake actuator to the brake pedal of the vehicle through a cable shield tube that is anchored to a first anchor point and a second anchor point. The first anchor point is separated a fixed distance from the brake actuator, and the second attachment point is separated a fixed distance from the brake pedal.

A primary objective of the present invention is to provide a braking apparatus having advantages not taught by the prior art.

Another objective is to provide a braking apparatus that can be located anywhere within a vehicle and still function to actuate a brake pedal of the vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
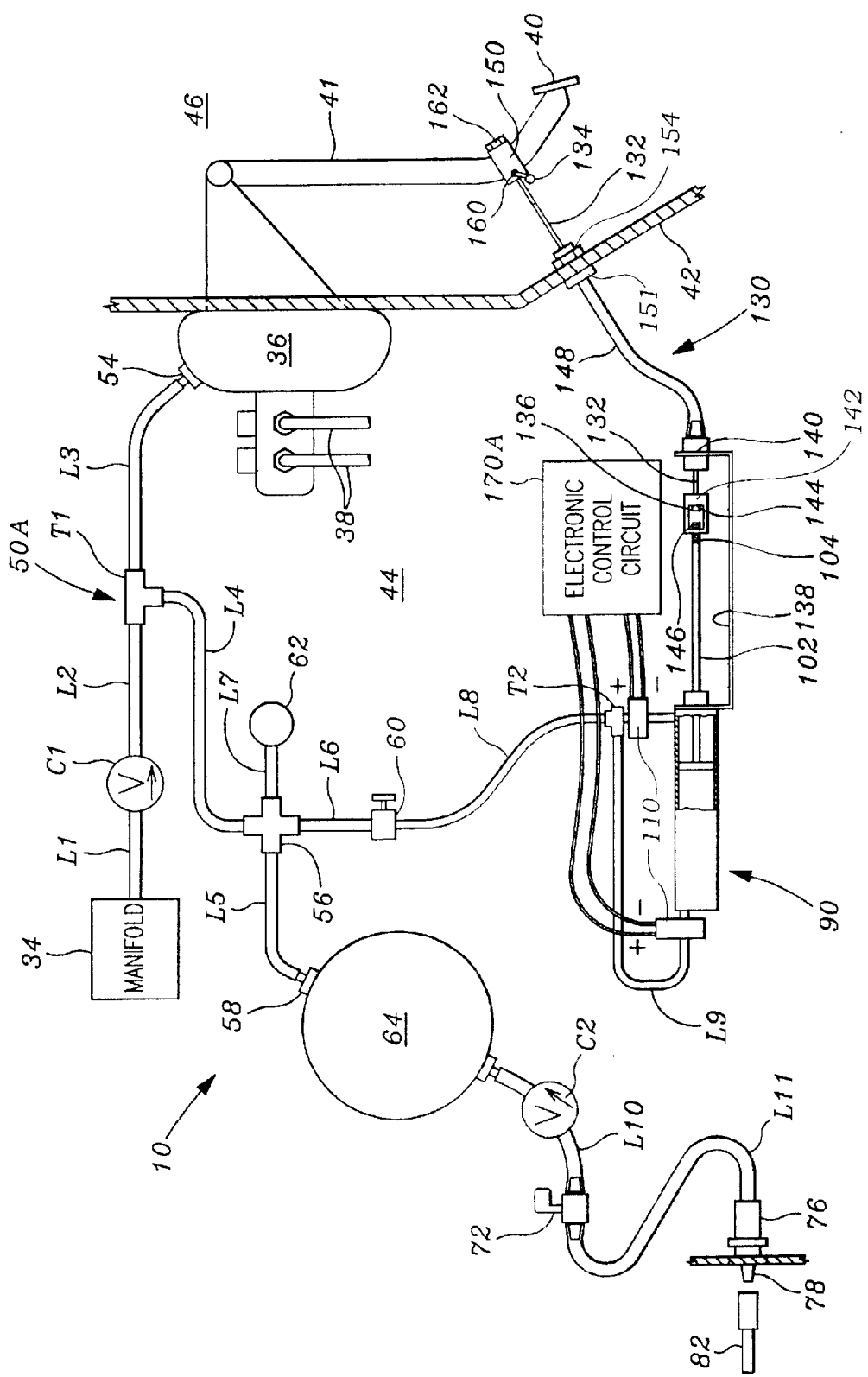
FIG. 1 is a side elevational view of a first embodiment of the present invention including a vacuum cylinder operably controlled by first and second vacuum control valves.

The above-described drawing figures illustrate the invention, a braking apparatus 10 used to brake a vehicle 30. The braking apparatus 10 includes a brake actuator 85 that actuates at least one brake 37 of the vehicle 30 through a means for operably connecting ("connecting means") 130 the brake actuator 85 to a vacuum power booster 36 to operatively control at least one brake 37 of the vehicle 30. The connecting means 130 is preferably a cable 132 that mechanically interconnects the brake actuator 85 to the brake pedal 40 of the vehicle 30 through a cable shield tube 148 that is anchored to a first anchor point 140 and a second anchor point 141. The first anchor point 140 is separated a fixed distance from the brake actuator 85, and the second attachment point 141 is separated a fixed distance from the brake pedal 40, as described below.

The braking apparatus 10 preferably further includes a vacuum conduit network 50 that connects a means for generating a vacuum 34 to both a vacuum power booster 36 and the brake actuator 85. The vacuum conduit network 50 preferably further includes a vacuum reservoir 64 and a first check valve C1 to maintain a ready supply of vacuum within the vacuum conduit network 50.

Cable

As shown in FIGS. 1–3, 7, 9, and 11, the cable 132 is preferably a flexible steel cable having a first cable end 133 and a second cable end 136. The cable 132 is positioned through an inner conduit 149C of the cable shield tube 148. The first cable end 133 is preferably adapted to attach to the brake pedal 40 and the second cable end 136 is adapted to attach to the brake actuator 85, as described below, so that the brake pedal 40 and the brake actuator 85 move responsively and the brake pedal 40 can be controlled by the brake actuator 85.

The cable shield tube 148 is a flexible but inelastic and incompressible tube such as a brake line. The cable shield tube 148 has an actuator end 149A and a vehicle end 149V. The actuator end 149A of the cable shield tube 148 is attached to a first anchor point 140; and the vehicle end 149V of the cable shield tube 148 is attached to a second attachment point 141. The second attachment point 141 is preferably provided by a firewall attachment means. The firewall attachment means 141 is adapted for attaching the vehicle end 149V of the cable shield tube 148 to the firewall 42 of the vehicle 30. The fixed location of the cable shield tube 148 with respect to the brake actuator 85 and the brake pedal 40, but not with respect to the vehicle 30, enables the cable 132 to manipulate the brake pedal 40 regardless of the location of the brake actuator 85 within the vehicle 30.

First Embodiment

Figure 2:
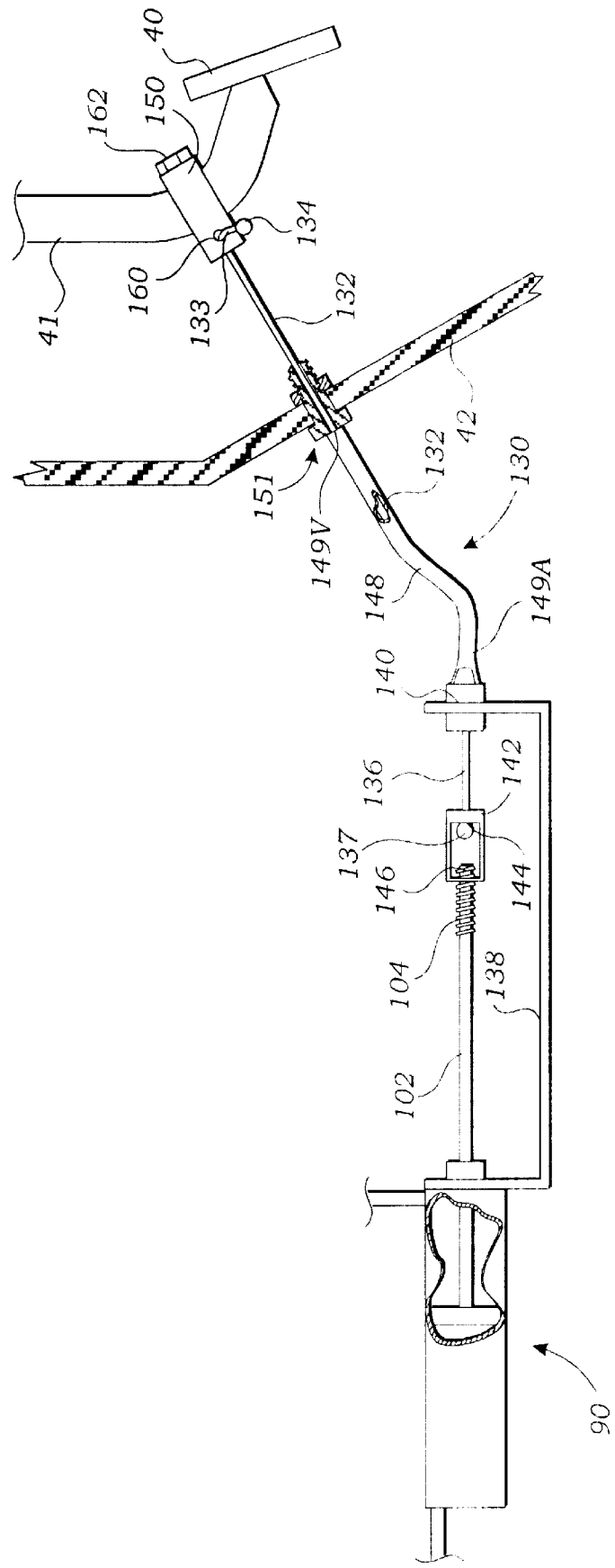
FIG. 2 is a side elevational view of the preferred embodiment of the connection means, the connection means including a cable positioned through a cable shield tube for attaching the vacuum cylinder to a brake pedal.
Figure 3:
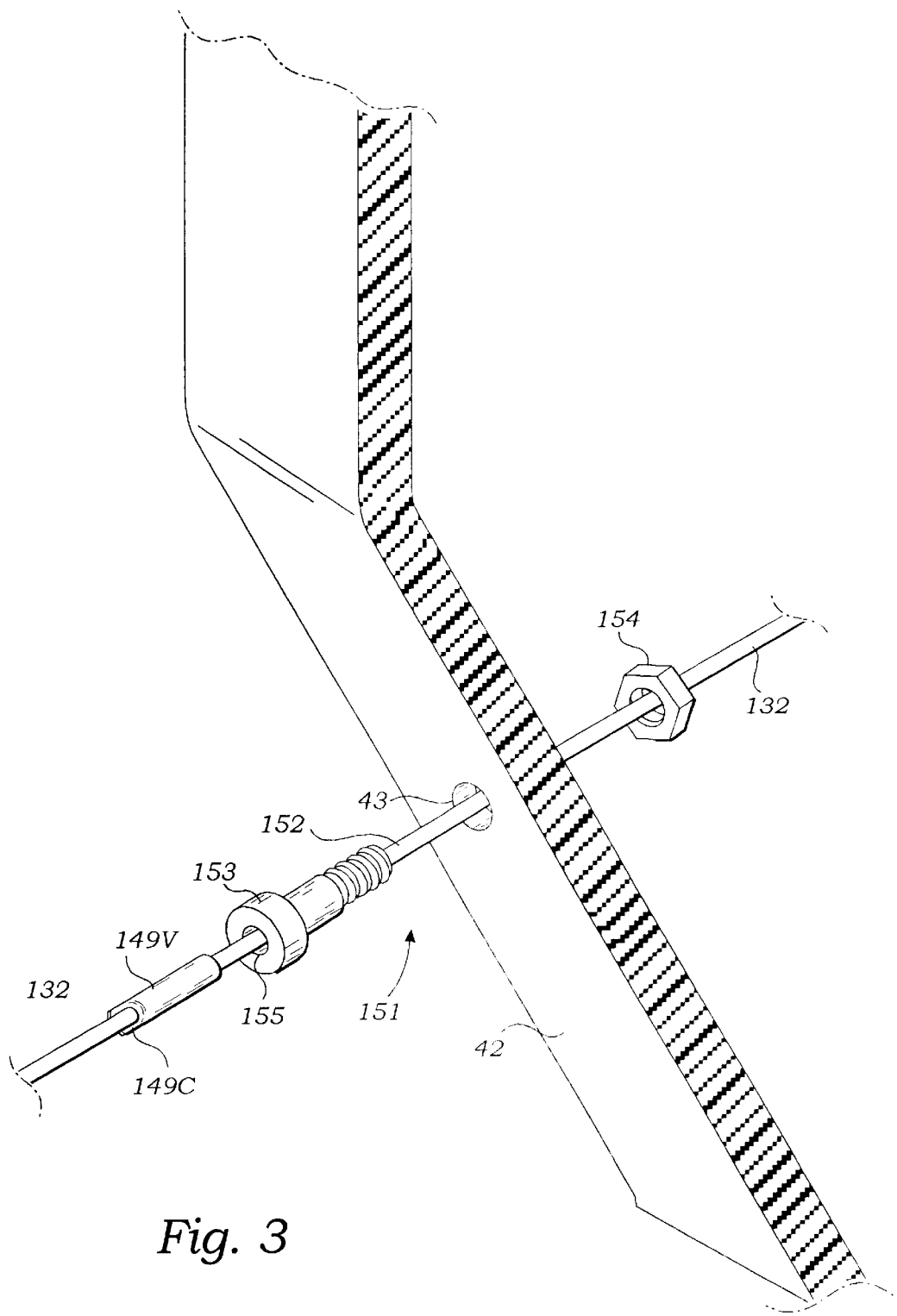
FIG. 3 is an exploded perspective view of an anchor bolt and anchor nut used to anchor the cable shield tube to a firewall of a vehicle.

A first embodiment of the connecting means is shown in FIGS. 1–3. In this embodiment, the first anchor point 140 is provided by a first end of a base plate 138 that is attached to and rigidly extends from the brake actuator 85. The actuator end 149A is attached securely to the first end 140 of the base plate 138 to prevent movement of the cable shield tube 148 with respect to the brake actuator 85. The base plate 138 is preferably a rigid arm, constructed of either steel, aluminum, rigid plastic, or other strong and durable material, that is slightly longer than a piston rod 102 of the brake actuator 85, described below; however, any rigid structure that is fixed in place with respect to the brake actuator 85 can serve this function, including the body of the vehicle 30 itself, if both the brake actuator 85 and the actuator end 149A are fixed with respect to each other. Other embodiments of the first anchor point 140 are described below.

As best shown in FIGS. 2 and 3, in this first embodiment the firewall attachment means 141 is provided by an externally threaded anchor bolt 151 mounted on the vehicle through a hole 43 in the firewall 42. In this embodiment, the brake actuator 85 is typically installed in an engine compartment 44 of the vehicle. The anchor bolt 151 has a coaxial conduit 153 running down the length of the anchor bolt 151, the coaxial conduit being large enough for the cable 132 to fit through. The anchor bolt 151 is fitted through the hole 43 in the firewall 42 and secured in place with an internally threaded anchor nut 154 that threadedly engages the anchor bolt 151 such that a head 152 of the anchor bolt 151 and the anchor nut 154 are on opposite sides of the firewall 42, thereby locking the anchor bolt 151 in place.

The vehicle end 149V of the cable shield tube 148 is securely attached to the anchor bolt 151 so that the cable shield tube 148 is co-axially engaged with the coaxial conduit 153 of the anchor bolt 151 and the cable shield tube 148 cannot move with respect to the firewall 42 and the brake pedal 40. The cable 132 runs through the cable shield tube 148 to the firewall 42 of the vehicle 30, where it passes through the firewall 42 by passing through the coaxial conduit 153 of the anchor bolt 151, and into the passenger compartment 46 of the vehicle 30 such that a first cable end 133 of the cable 132 is adjacent to the brake pedal 40. The first cable end 133 includes a means for attaching the cable 132 to the brake pedal 40.

As shown in FIGS. 1 and 2, the means for attaching the cable 132 to the brake pedal 40 is preferably a brake pedal clamp 150. The brake pedal clamp 150 preferably includes a pair of metal brackets that are attached to either side of the brake pedal 40, or the brake pedal arm 41, and locked into place with a pair of locking bolts 162. For purposes of this invention, the brake pedal 40 and the brake pedal arm 41 are considered to be the same, and the specific point of connection is determined during installation of the braking apparatus 10. Then the braking apparatus 10 is used as an anti-theft device, the brake pedal clamp 150 is designed to semi-permanently engage the brake pedal 40 so a thief cannot remove the braking apparatus 10 by disconnecting the cable 132 from the brake pedal 40. In a typical towing embodiment, the brake pedal clamp 150 is designed for easy installation and removal. The brake pedal clamp 150 is also preferably easily moved along the length of the brake pedal arm 41 so that the strength of the braking apparatus 10 can be easily adjusted.

Once the brake pedal clamp 150 is locked into place, the cable 132 is attached to the brake pedal clamp 150. In the preferred embodiment, the first cable end 133 includes an anchor bulb 134 that lockingly engages a locking hole 160 of the brake pedal clamp 150. The first cable end 133 of the cable 132 is designed to easily slide into the locking hole 160, where the anchor bulb 134 located at the first cable end 133 is able to lock the cable 132 into place, the anchor bulb 134 being larger than the locking hole 160.

The second cable end 136 includes a means for operatively attaching the cable 132 to the brake actuator 85. As shown in FIGS. 1 and 2, the means for attaching the cable 132 to the brake actuator 85 is preferably a rod/cable clip 142 that mechanically connects the cable 132 to the piston rod 102 operably connected to the brake actuator 85. The second cable end 136 of the cable 132 is threaded through a clip hole 144 in the rod/cable clip 142 and locked into place, preferably with a cable stop 137, to prevent the cable 132 from disengaging the rod/cable clip 142. An internally threaded rod receiving section 146 of the rod/cable clip 142 is then threadedly engaged to an externally threaded end 104 of the piston rod 102 to firmly connect the cable 132 to the piston rod 102. By rotating the internally threaded rod/cable clip 142 with respect to the externally threaded piston rod 102, the rod/cable clip 142 threadedly moves up or down the length of the piston rod 102, adjusting the overall length of the connecting means 130, thereby removing any slack from the cable 132.

Figure 7:
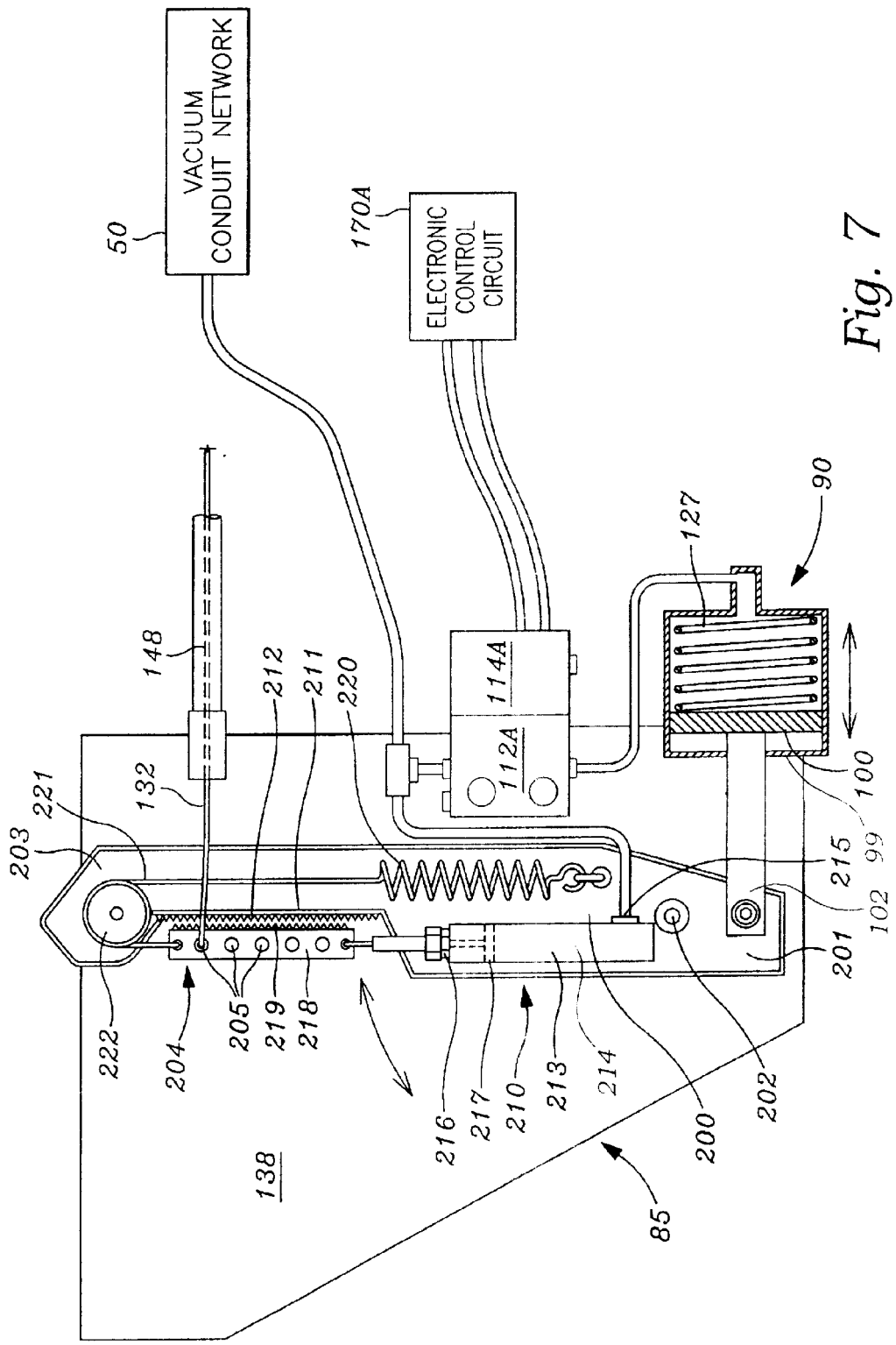
FIG. 7 is a side elevational view of a second embodiment of the brake actuator, the second embodiment having a vacuum cylinder operably engaged to a lever arm pivotally mounted to a base plate for moving the brake pedal from the non-braking position to the braking position.
Figure 9:
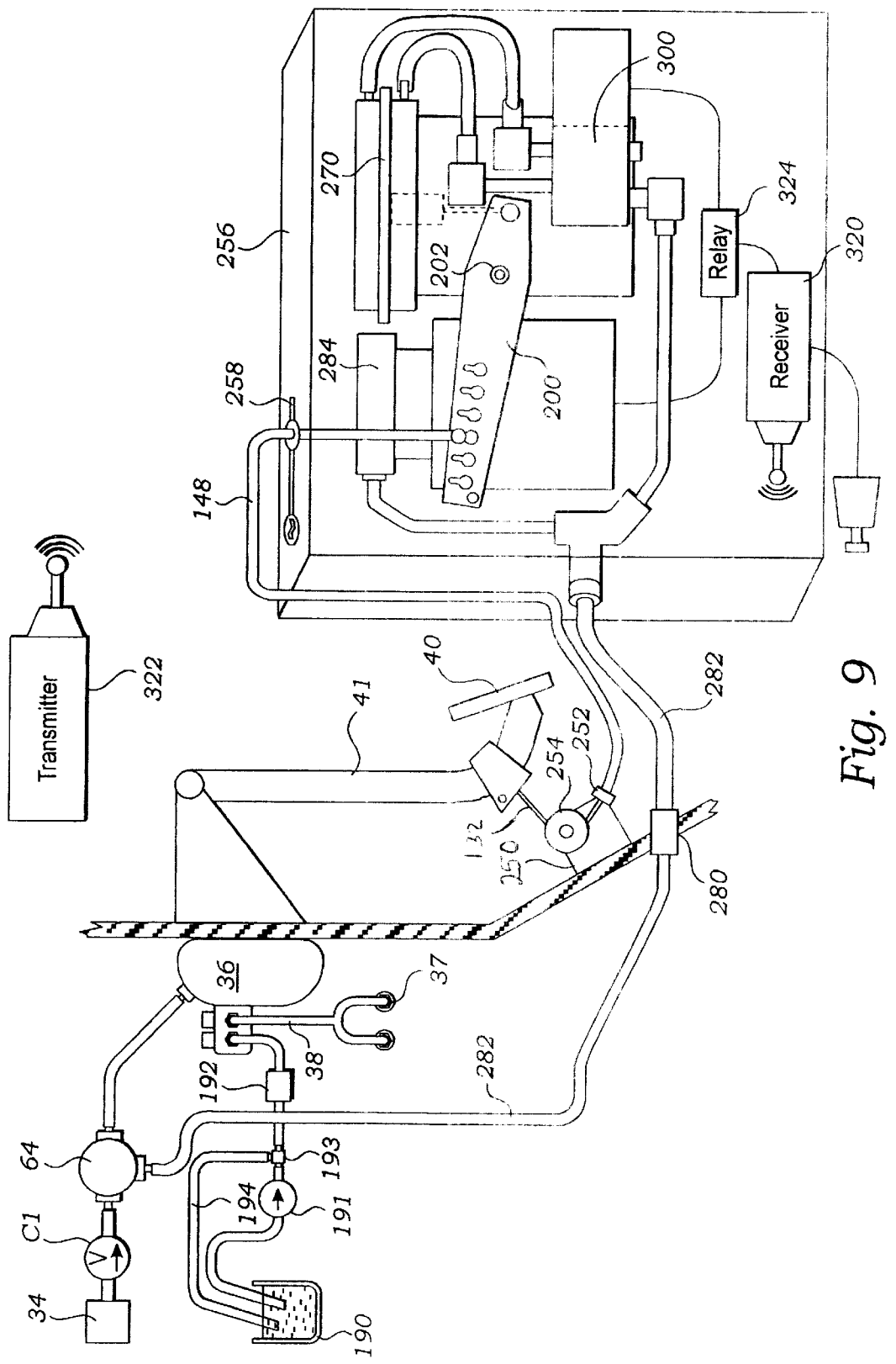
FIG. 9 is a side elevational view of an alternative view of the braking device, the braking device being adapted to be mounted within a passenger compartment of the vehicle.

In an alternative embodiment, as shown in FIGS. 7 and 9, the means for operatively attaching the cable 132 to the brake actuator 85 includes a lever arm 200 attached to a pivot point 202, the pivot point 202 being mounted a fixed distance from the brake actuator 85. These embodiments are described in greater detail below. In addition to the described embodiments, those skilled in the art will recognize that there are many possible structures that can be used to connect the cable 132 and the operative portion of the brake actuator 85, and alternative connection structures that can be readily devised by those skilled in the art should be construed as within the scope of this invention.

Second Embodiment

In a second embodiment, as shown in FIG. 9, the brake actuator 85 is installed in a passenger compartment 46 of the vehicle 30. In the second embodiment, the second mounting point 141 is an L-bracket 250 fastened to the firewall 42 behind the brake pedal arm 41. The L-bracket 250 includes a locking portion 252 that lockingly engages the cable shield tube 148.

The L-bracket 250 preferably further includes a pulley 254 rotatably attached to the L-bracket 250 for directing the cable 132. The cable 132 passes out of the cable shield tube 148 and around the pulley 254 for attachment to the brake pedal clamp 150. The innovative use of the first and second anchor points 140 and 141 with the cable shield tube 148 makes it irrelevant where the brake actuator 85 is actually located. This is a great advantage over prior art devices, which could generally only be located in a very particular location in the passenger compartment 46 of the vehicle.

In this second embodiment, the braking apparatus 10 is contained within a box 256 constructed of rigid and durable material such as steel or rigid plastic. In this embodiment, the brake actuator 85 is fixedly attached to the box 256, and the box 256 further includes a locking slot 258 for attaching the actuator end 149A of the cable shield tube 148. While the locking slot 258 could be provided by a simple aperture or mounting point, the slot structure is preferred because it allows the cable shield tube 148 to slide laterally with respect to the brake actuator 85 and accommodate adjustments. The brake actuator 85 used in this embodiment is discussed in greater detail below.

While the preferred embodiments of the connecting means are described above, it is also possible to use other equivalent connecting means well known in the art. This has typically been accomplished in the prior art with a rod (not shown) that mechanically connects the brake actuator 85 and the brake pedal 40. An example of such a connecting means is disclosed in Overhulser, U.S. Pat. No. 5,911,483, and Harness, U.S. Pat. No. 5,411,321, both hereby incorporated by reference; however, many alternative mechanical connections that are equivalent to the structures described herein can be devised by those skilled in the art, and such equivalent structures should be considered within the scope of the invention as claimed.

Although the brake actuator 85 is located in the passenger compartment 46, it is still desirable to provide vacuum to the vacuum power booster 36. To accomplish this, a vacuum conduit tunnel 280 is provided through the firewall 42 so that an alternative vacuum conduit network 262 connects the vacuum power booster 36 with a vacuum pump 284. In yet another alternative embodiment, shown in FIG. 11, an alternative vacuum pump 286 is located in the engine compartment 44 for connection to the vacuum power booster 36 without cutting through the firewall 42.

The Vacuum Reservoir and Check Valve

Figure 12:
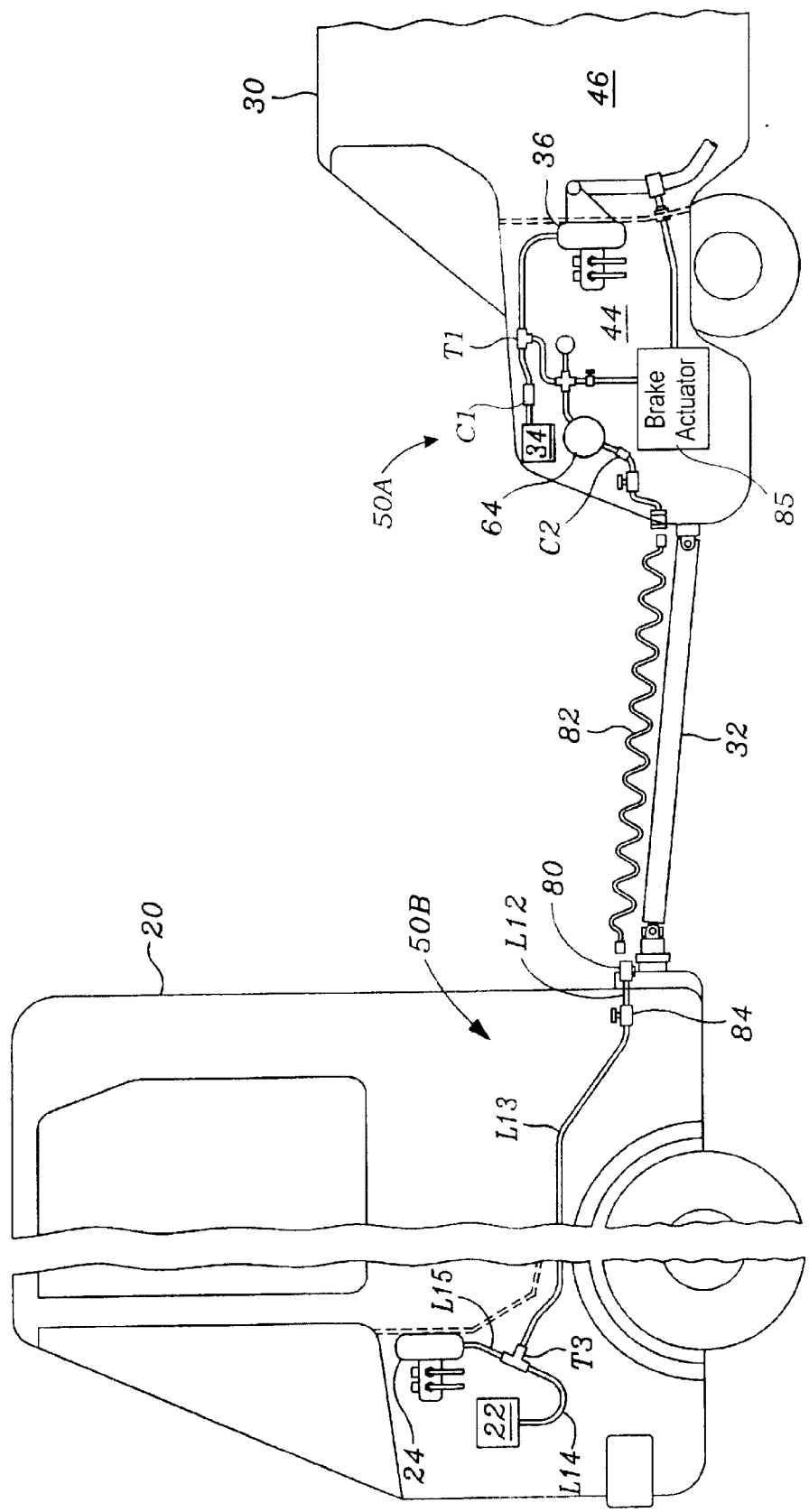
FIG. 12 is a side elevational view of the brake actuator configured for use when the vehicle is being towed by a towing-vehicle.
Figure 13:
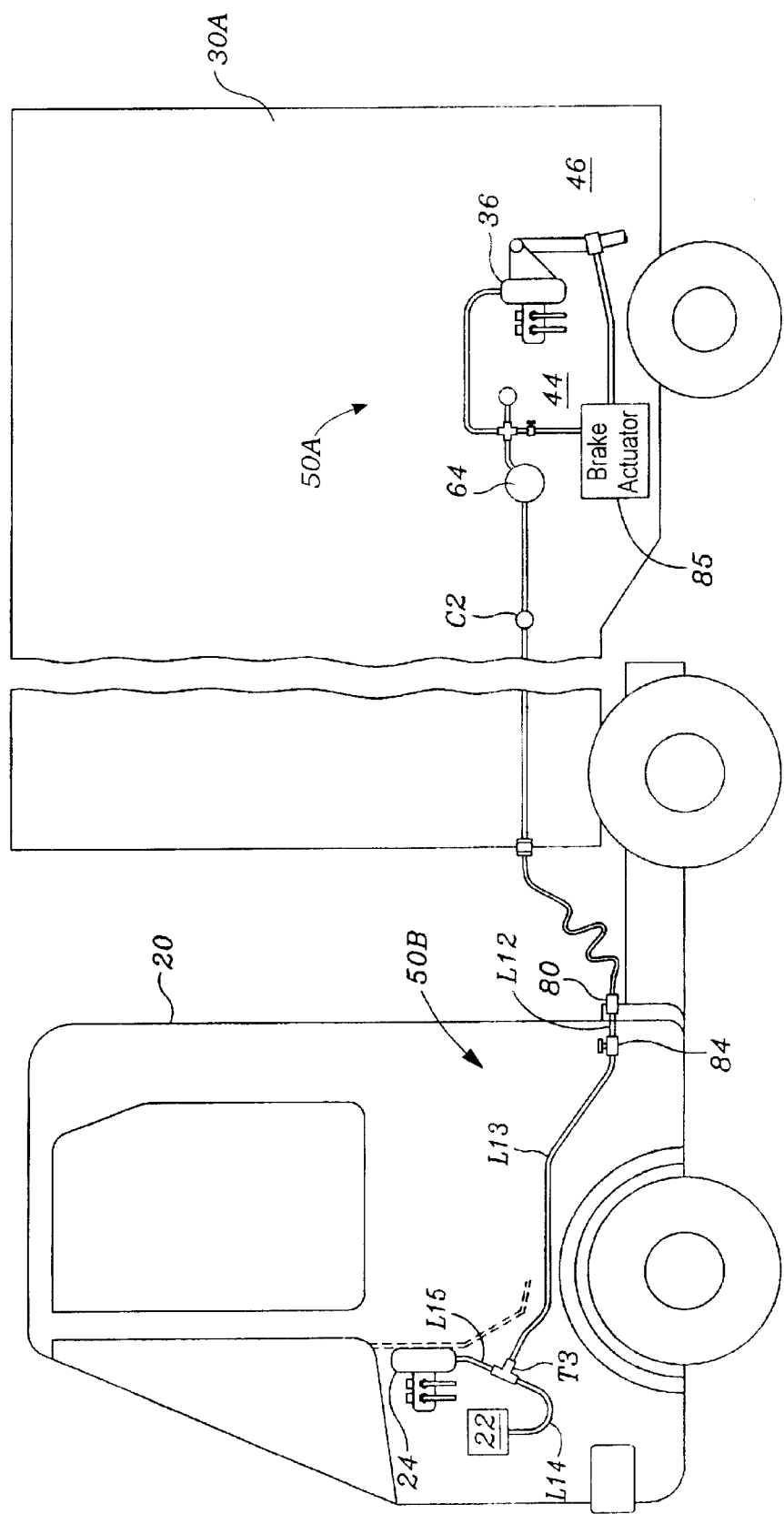
FIG. 13 is a side elevational view of the brake actuator configured for use in a trailer.

The means for generating a vacuum of this braking apparatus 10 is operably connected to a vacuum conduit network 50 through a first check valve C1. In a first embodiment, as shown in FIGS. 1, 9, and 12, the means for generating a vacuum is an engine manifold 34 of the vehicle 30. In an alternative embodiment, as shown in FIGS. 12 and 13, the means for generating a vacuum is a remote vacuum source 22, a vacuum generator such as a towing-vehicle engine manifold. In yet another alternative embodiment, described above, the means for generating a vacuum is the vacuum pump 282 shown in FIG. 9, or the alternative vacuum pump 284 shown in FIG. 11. Since the source of the vacuum is not important to the function of the invention, those skilled in the art can devise many arrangements of pumps, vacuum canisters, or other mechanisms to generate the necessary vacuum.

The vacuum conduit network 50 is preferably constructed of vacuum tubing that does not collapse under vacuum. Such vacuum tubing is well known in the art and therefore does not merit detailed discussion. The first check valve C1 allows the manifold 34 to pull a vacuum within the vacuum conduit network 50. However, if the manifold 34 ceases to pull vacuum, the first check valve C1 prevents air from leaking back into the vacuum conduit network 50. The vacuum conduit network 50 is connected to a vacuum power booster 36 to supply the vacuum power booster 36 with the vacuum necessary for it to function. Various vacuum power boosters 36 are well known in the prior art and therefore not discussed in detail herein. Examples of acceptable vacuum power boosters 36 are disclosed in Kobashi et al., U.S. Pat. No. 3,685,289 and Maggioni et al., U.S. Pat. No. 5,012,647, both hereby incorporated by reference in full.

As shown in FIG. 9, and as described in Kobashi et al., U.S. Pat. No. 3,685,289 and Maggioni et al., U.S. Pat. No. 5,012,647, the vacuum power booster 36 is operably connected to at least one brake 37 with a standard brake line 38, such that depression of the brake pedal 40 causes the vacuum power booster 36 to actuate the at least one brake 37. In its preferred embodiment, the vacuum power booster 36 receives brake fluid from a fluid reservoir 190 through a fluid pump 191 and a fluid accumulator 192. The fluid pump 191 pumps brake fluid from the fluid reservoir 190 to the fluid accumulator 192 so there is always a ready supply of pressurized brake fluid. A flow dividing valve 193 is preferably located between the fluid pump 191 and the fluid accumulator 192 so that if fluid pressures become too high, excess brake fluid can be returned to the fluid reservoir 190 through an overflow conduit 194.

The novelty of this invention is that the vacuum conduit network 50 is capable of storing vacuum in the vacuum reservoir 64 while the check valve C1 prevents air from leaking into the vacuum conduit network 50 when the manifold 34 is not pulling a vacuum. The vacuum reservoir 64 is preferably a rigid cylinder capable of storing vacuum. In the event that the manifold 34 ceases to function, the check valve C1 stops air from leaking into the vacuum reservoir 64. This maintains a supply of vacuum pressure to the vacuum power booster 36 even following a loss of vacuum from the manifold 34. The primary benefit of the above-described improvement to the prior art braking system is that the vacuum power booster 36 will continue to function even following a total loss of power from the engine (not shown) of the vehicle 30. Since fully-functioning and power-assisted brakes can be critical in emergency braking situations, the improved braking apparatus 10 described herein provides a critical benefit over the prior art.

Throughout the description of this invention we will sometimes speak in terms of vacuum "flowing" through conduits and apertures and "pulling" or "moving" various elements. It is taken as understood that vacuum, being the absence of air, cannot "flow" or "move" anything. Vacuum "flowing" is the state in which air flows out of an area; and atmospheric air pressure acts to "move" the elements involved in the absence of a counterbalancing atmospheric pressure in the area of the vacuum. However, we will speak in terms described above to simplify the description of the structure and function of the invention.

Brake Actuator

The brake actuator 85 can be provided by one of many various mechanisms, including various air or vacuum actuated cylinders well known in the art, or even directly actuated by a motor or equivalent mechanism. Several of these embodiments are discussed in detail below.

Vacuum Actuated Servo Mechanism

As shown in FIGS. 1, 2, 4, and 5, the brake actuator 85 is preferably a vacuum actuated servo mechanism 90, and the vacuum actuated servo mechanism 90 includes a means for controlling the flow of vacuum ("vacuum control means") 110 into the vacuum actuated servo mechanism 90, thereby actuating the vacuum actuated servo mechanism 90. The vacuum actuated servo mechanism 90, described in detail below, is preferably a vacuum of cylinder; however, a similar cylinder can readily be adapted for use with air pressure, although such a conversion would forfeit some of the advantages of the preferred embodiment.

As shown in FIGS. 1, 2, 4, and 5, the vacuum cylinder 90 preferably has a plunger 100 that slidably engages an internal chamber 91 of the vacuum cylinder 90 responsive to the presence or absence of atmospheric air/vacuum force within the internal chamber 91 as described below. A means for electronically controlling ("electronic control means") 170 the vacuum control means 110 allows the user to direct the vacuum force to manipulate the plunger 100, moving it from a non-braking position to a braking position. The connecting means 130, described above, enables the vacuum cylinder 90 to actuate the vacuum power booster 36, which operatively controls the at least one brake 37. An advantage of the preferred embodiment is that vacuum is available to power both the vacuum power booster 36 of the vehicle 30 and the vacuum cylinder 90.

The plunger 100 slidaby engages an internal chamber 91 of the vacuum cylinder 90 and forms an airtight seal within the vacuum cylinder 90, separating the internal chamber 91 into first and second chambers 92 and 96. The vacuum cylinder 90 has a first aperture 94 and a second aperture 98, the first aperture 94 communicating with the first chamber 92 and the second aperture 98 communicating with the second chamber 96. The plunger 100 includes a piston rod 102 that extends from the second chamber 96 through a piston rod conduit 99. The piston rod conduit 99 forms a seal around the piston rod 102, allowing the piston rod 102 to slide freely but not allowing air to leak into the second chamber 96. The piston rod conduit 99 is located opposite the first aperture 94 and coaxial with the vacuum cylinder 90. The piston rod 102 is designed to engage the connecting means 130. The piston rod 102 therefore preferably has an externally threaded section 104 at the other end allowing the connecting means 130 to threadedly engage the piston rod 102.

The vacuum cylinder 90 is a rigid container, preferably made of metal or plastic, preferably having a diameter of 2 inches. Those skilled in the art will be capable of selecting different cylinder sizes based upon the specific requirements of the individual system. If a greater amount of pull is necessary, the vacuum cylinder 90 should have a larger diameter.

Figure 6:
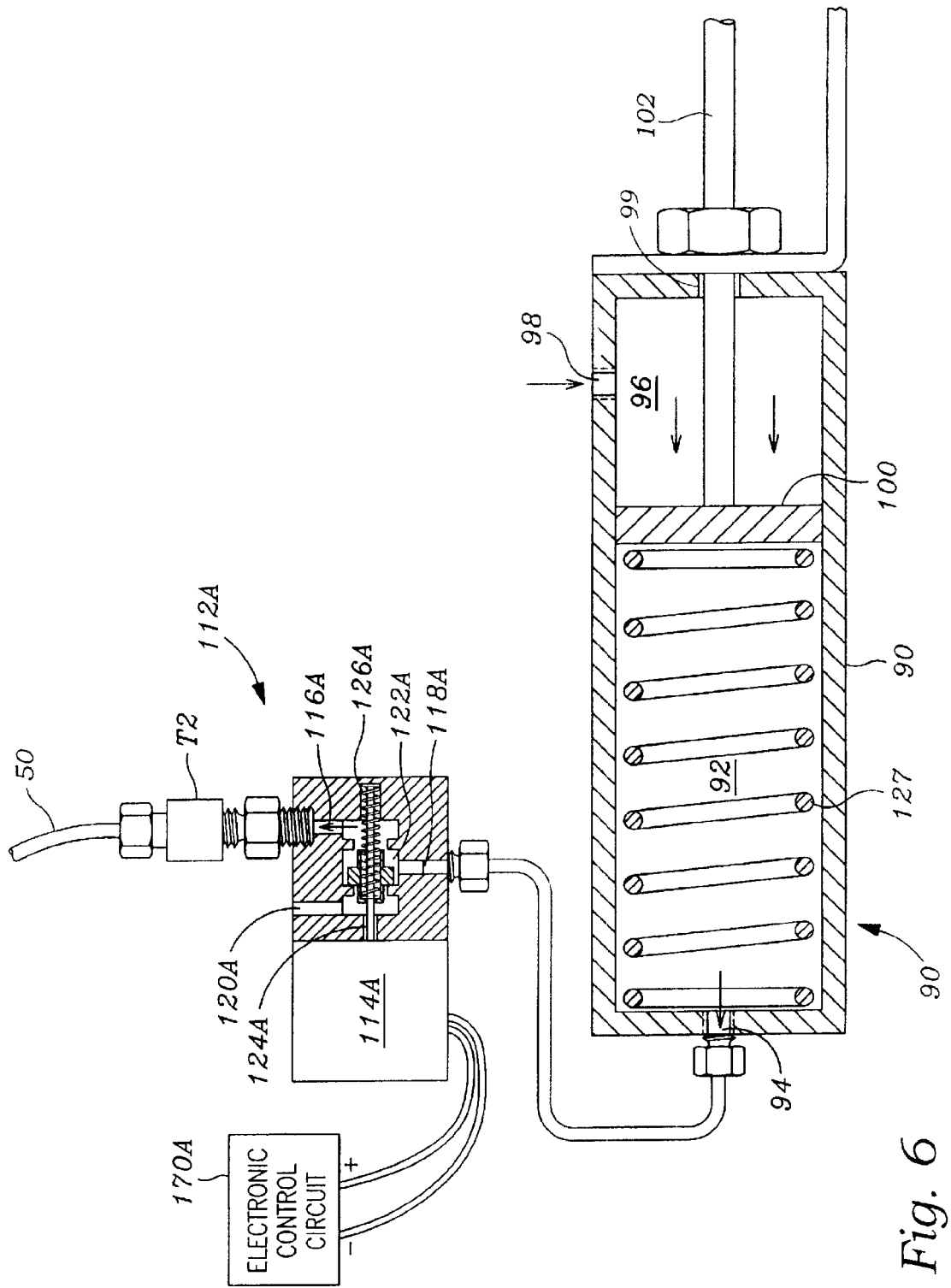
FIG. 6 is a side elevational cross sectional view of an alternative vacuum cylinder, the alternative vacuum cylinder having a vacuum control valve directing the vacuum force of the vacuum conduit network to move the plunger from a non-braking position to a braking position against the bias of a return spring.
Figure 8:
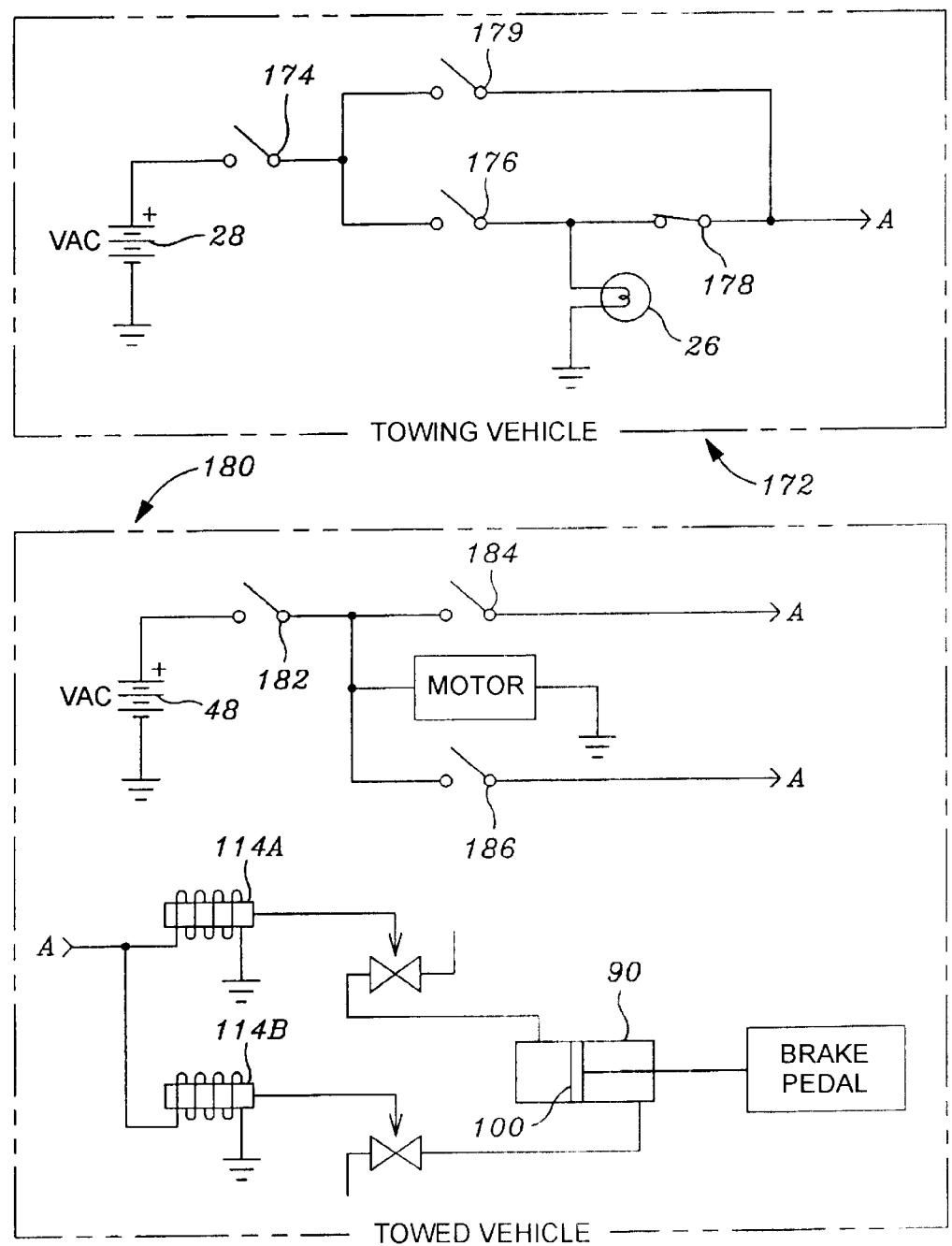
FIG. 8 is an electrical schematic of an electronic control circuit, illustrating how various switches electronically actuate the first and second vacuum control valves to control the brake pedal.

Those skilled in the art can devise various vacuum modules that function in a fashion similar to the vacuum cylinder 90 described above. Alternative embodiments of the vacuum actuated servo mechanism 90 and the vacuum control means 110 are shown in FIGS. 6, 7, and 9. First and second embodiments of the actuated servo mechanism 90, shown in FIGS. 6 and 7, are similar to the vacuum cylinder of the first embodiment, only the vacuum cylinder includes a return spring 127. As shown in a third embodiment, as shown in FIG. 8, the vacuum actuated servo mechanism 90 includes a flexible diaphragm 270 rather than the plunger 100, and the cable 132 is attached to the diaphragm. These alternative embodiments are described in greater detail below. Furthermore, it is understood that those skilled in the art can modify the vacuum cylinder 90 for use with air pressure rather than vacuum, and alternative structures that use air pressure rather than vacuum to actuate the brake actuator 85 should be considered within the scope of the present invention.

Finally, it is also possible to use a motor such as a linear motor 290, described below. It is expressly understood that devices including any modifications reasonably made by those skilled in the art are equivalent to the described invention.

Vacuum Control Means

In its most basic concept, the vacuum control means 110 is a mechanism that directs the vacuum from the vacuum conduit network 50 into the first and second chambers 92 and 96 of the vacuum cylinder 90 to manipulate the plunger 100 (or the flexible diaphragm 270), thereby moving the brake pedal 40 through the connecting means 130. Several embodiments of the vacuum control means 110 are described below, with minor modifications to the vacuum cylinder 90 necessary to accommodate the different structures of the vacuum control means 110. Once again, it is expressly understood that those skilled in the art can devise alternative structures to perform the stated task without deviating from the spirit of this invention. Such modifications should be construed as equivalent to the described invention and within the scope of the below described claims.

Vacuum Cylinder with Two Vacuum Control Valves

Figure 4:
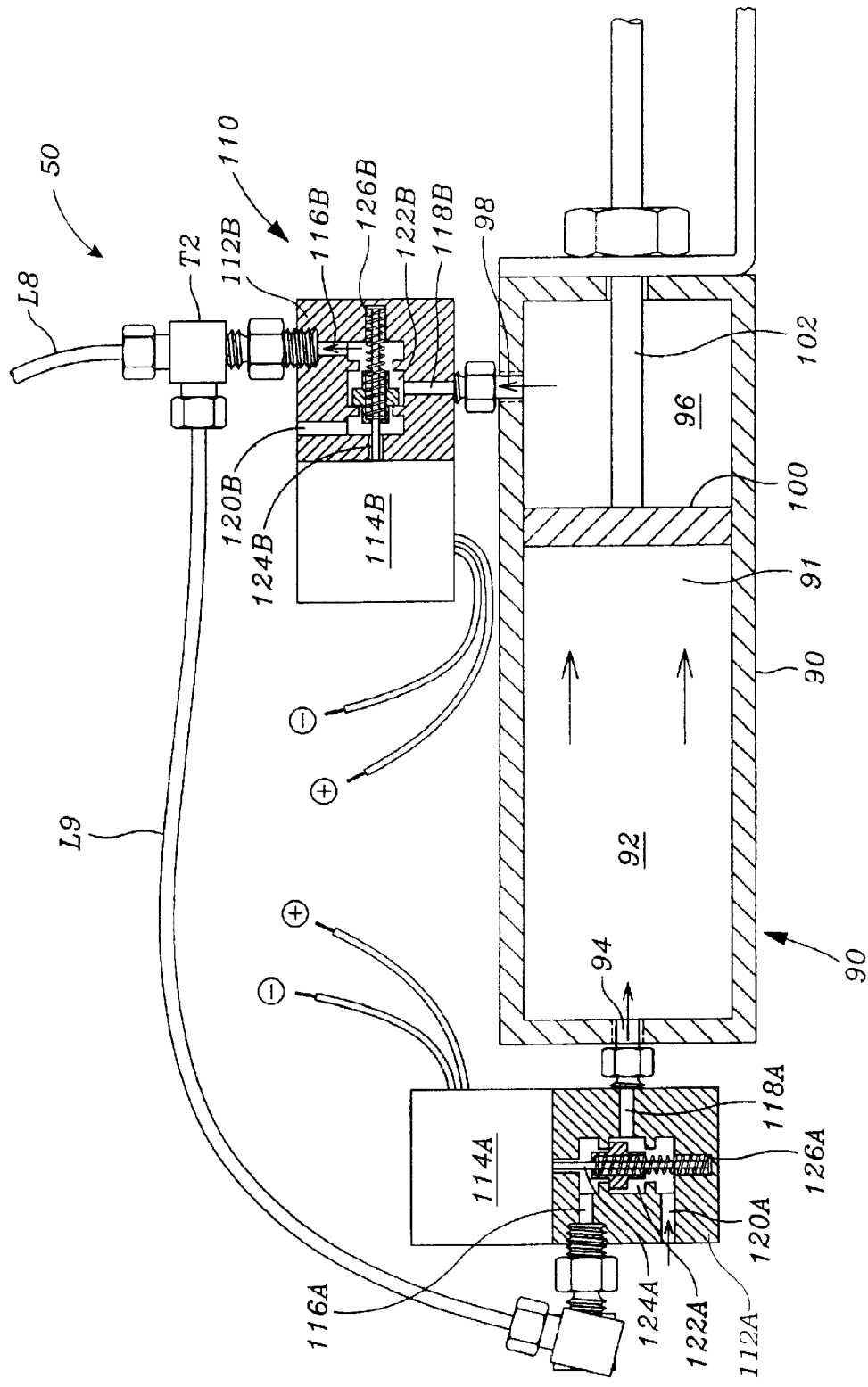
FIG. 4 is a side elevational cross sectional view of the vacuum cylinder, the first and second vacuum control valves being configured to hold a plunger of the vacuum cylinder in a non-braking position.
Figure 5:
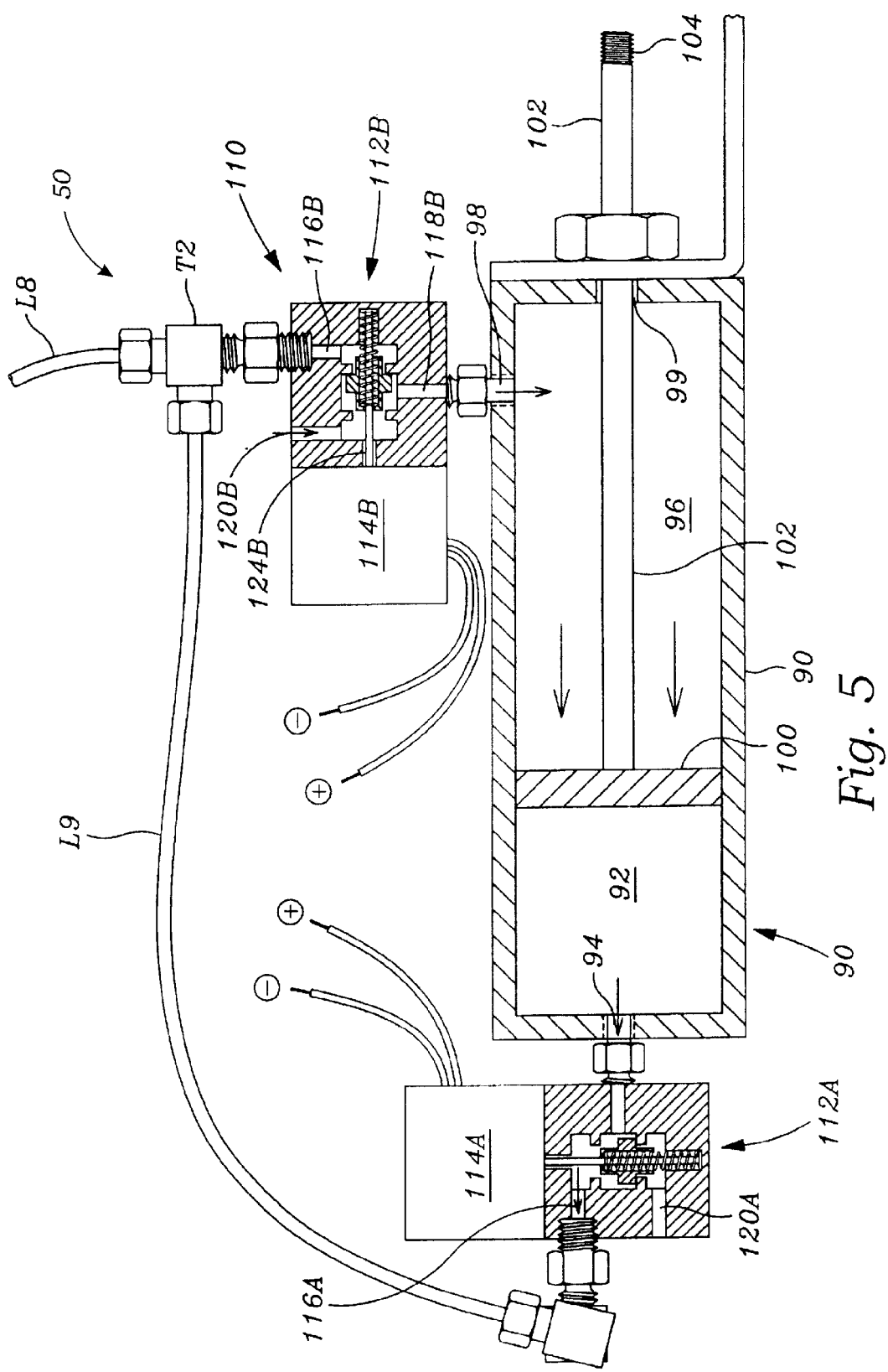
FIG. 5 is a side elevational cross sectional view of the vacuum cylinder, the first and second vacuum control valves being configured to direct vacuum force from the vacuum conduit network to move the plunger to a braking position.

In its preferred embodiment, as shown in FIGS. 1, 4, and 5, the vacuum control means 110 consists of first and second vacuum control valves 112A and 112B, both operably connected to the vacuum conduit L8. In its preferred mode, the vacuum conduit L8 is connected to a three-way conduit connector T2, with one aperture connected directly to the second vacuum control valve 112B while the second aperture is connected to the first vacuum control valve 112A through vacuum conduit L9. The first and second vacuum control valves 112A and 112B each have input conduits 116A and 116B, an output conduit 118A and 118B, and an exhaust conduit 120A and 120B. Within each of the vacuum control valves 112A and 112B, all three conduits lead to central chambers 122A and 122B. The exhaust conduits 120A and 120B are preferably covered with a filter (not shown) to prevent contaminants from getting into the first and second vacuum control valves 112A and 112B. The first and second vacuum control valves 112A and 112B are each operably controlled by the electronic control means 170. In this embodiment, the electronic control means 170 includes first and second vacuum control switches 114A and 114B, preferably a solenoid switch that manipulate a central push rod 124A and 124B to direct air flow through the first and second vacuum control valves 112A and 112B and into and out of the vacuum cylinder 90. The electronic control means 170 preferably also includes an electronic control circuit 170A that allows the user to operably control the first and second solenoid switches 114A and 114B. The specific structure of the electronic control circuit 170A will vary depending upon the specific embodiment of the invention. The preferred embodiment of the electronic control circuit 170A is shown in FIG. 8 and described in greater detail below. The electronic control means 170 can include different arrangements of solenoids, as described below, and can be activated by various mechanisms, including direct trigger activation, remote wireless activation, and also activation in response to various sensors such as motion detectors, door sensors, radar systems, anti-theft sensors, or any of the various sensors that have been developed in the prior art for automatic actuation of brakes.

The three-way conduit connector T2 is connected to the input conduit 116A of a first vacuum control valve 112A by vacuum conduit L9. In its preferred mode, the three-way conduit connector T2 is a rigid fitting that is directly connected to the input conduit 116A of a first vacuum control valve 112A; however, in alternative embodiments, the two are connected by a vacuum conduit. The three-way conduit connector T2 is also connected to an input conduit 116B of a second vacuum control valve 112B. The output conduits 118A and 118B of the first and second vacuum control valves 112A and 112B are operably connected to the first and second apertures 94 and 98, allowing the output conduits 118A and 118B of the first and second vacuum control valves 112A and 112B to communicate with the first and second chambers 92 and 96. In each of the vacuum control valves 112A and 112B, the central push rod 124A and 124B is biased towards a resting position by a spring 126A and 126B. In response to the electronic control means 170, as shown in FIG. 6, the first and second solenoid switches 114A and 114B are energized and push the central push rods 124A and 124B to an activated position.

In the resting position, as shown in FIG. 4, the solenoid springs 126A and 126B bias the central push rods 124A and 124B to their resting position. In this resting position, the central push rod 124A of the first vacuum control valve 112A is positioned to cover the input conduit 116A, allowing the exhaust conduit 120A of the first vacuum control valve 112A to communicate with the output conduit 118A, thereby allowing air at atmospheric pressure to enter the first chamber 92. In the second vacuum control valve 112B, the solenoid spring 126B biases the central push rod 124B to cover the exhaust conduit 120B, allowing the input conduit 116B to communicate with the second chamber 96, thereby allowing the vacuum from the vacuum conduit network 50 to remove the air from the second chamber 96. The combination of the air at atmospheric pressure in the first chamber 92 and the vacuum in the second chamber 96 holds the plunger 100 and the piston rod 102 in the resting position.

When the electronic control circuit 170A of the electronic control means 170, shown in FIG. 8, is energized, the first and second solenoid switches 114A and 114B overcome the bias of the solenoid springs 126A and 126B and push the central push rods 124A and 124B to their activated positions, as shown in FIG. 5. In the first vacuum control valve 112A, the central push rod 124A moves to cover the exhaust conduit 120A, allowing the input conduit 116A of the first vacuum control valve 112A to communicate with the output conduit 118A, thereby allowing vacuum from the vacuum conduit network 50 to remove all air from the first chamber 92, creating a vacuum within the first chamber 92. In the activated position, the central push rod 124B of the second vacuum control valve 112B is positioned to cover the input conduit 116B, allowing the exhaust conduit 120B to communicate with the output conduit 118B, thereby allowing air at atmospheric pressure into the second chamber 96. The combination of the vacuum in the first chamber 92 and the air at atmospheric pressure in the second chamber 96 causes the plunger 100 to move towards the first chamber 92, pulling the piston rod 102 inwards to a braking position.

Vacuum Cylinder with One Solenoid Valve and a Return Spring

As shown in FIGS. 6 and 7, an alternative embodiment of the vacuum actuated servo mechanism 90 includes the use of a return spring 127, rather than the second vacuum control valve, to bias the plunger 100 in the resting position within the vacuum cylinder 90. The return spring 127 can be positioned in either the first chamber 92, as shown in FIG. 6, or in the second chamber 96, as shown in FIG. 7, depending upon the nature of the return spring 127, as long as the return spring 127 biases the plunger 100 towards the non-braking position. As in the other embodiments, the plunger 100 includes a piston rod 102 that extends from the second chamber 96 of the vacuum actuated servo mechanism 90 through a piston rod conduit 99.

The vacuum cylinder 90 shown in FIGS. 6 and 7 is similar to the vacuum cylinder 90 shown in FIGS. 4 and 5, only it lacks the second vacuum control valve 112B. The vacuum cylinder 90 instead uses the return spring 127 and the second aperture 98 allows atmospheric air into the second chamber 96. In this embodiment, the piston rod conduit 99 does not need to form an airtight seal around the piston rod 102. Indeed, if the piston rod conduit 99 allows enough atmospheric air into the second chamber 96, it is not even necessary to include the second aperture 98; however, it is preferred to include the second aperture 98 including a filter (not shown) to allow air into the second chamber 96 without allowing contaminants into the vacuum cylinder 90. The atmospheric pressure in the second chamber 96 acts to move the plunger 100 against the bias of the return spring 127 when a vacuum is introduced through the first vacuum control valve 112A into the first chamber 92. This embodiment generally requires a vacuum cylinder 90 having a larger diameter than otherwise required because a larger diameter plunger 100 is required to overcome the resistance of the return spring 127, but it has the advantage of not requiring the second vacuum control valve 112B.

While the vacuum cylinder 90 with first and second vacuum control valves 112A and 112B is the preferred means of actuating the brake pedal 40, those skilled in the art can devise many similar structures to accomplish the same task. One additional structure that is also commonly used is replacing the first and second vacuum control valves 112A and 112B (a pair of three-way valves) with a single four way valve 300, shown in FIG. 9, to direct vacuum force into the different chambers of the brake actuator 85. These structures, and other related structures, should be considered equivalent to this embodiment and within the scope of the below described claims.

Vacuum Module and Pivot Arm Embodiment

As shown in FIGS. 7 and 9, an alternative embodiment of the connecting means 130 includes a lever arm 200 that allows easy adjustment of the braking force exerted on the at least one to brake 37. In its most preferred embodiment, described below, the lever arm 200 also includes an altitude adjustment assembly 210 that allows the braking device to automatically adjust the force of braking to compensate for the loss of effectiveness of vacuum actuated devices at higher altitudes.

Many elements of this embodiment are similar to or identical to the above-described connecting means 130. The base plate 138 is firmly attached to the vacuum actuated servo mechanism 90. The lever arm 200 is attached to the base plate 138 with a pivot point 202. The piston rod 102 attached to the plunger 100 extends from the vacuum actuated servo mechanism 90 and is pivotally attached to a first lever end 201 of the lever arm 200. A second lever end 203 of the lever arm 200 includes a means for adjustably attaching 204 to the second lever end 203 of the lever arm 200 to the brake pedal 40, or directly to the vacuum power booster 36. The adjustably attaching means 204 preferably includes a plurality of attachment points 205 longitudinally spaced along the length of the second lever end 203. The cable 132 removably engages one of the plurality of attachment points 205 and connects the lever arm 200 to the brake pedal 40 through the cable shield tube 138 as described above. With this configuration, the user is able to select one of the plurality of attachment points 205 to provide the braking strength that suits the vehicle 30.

Altitude Adjustment Assembly

In its most preferred embodiment, as shown in FIG. 7, the second lever end 203 preferably includes an altitude adjustment assembly 210 that automatically adjusts the position of the plurality of attachment points 205 in response to differences in atmospheric pressure to correct for changes in the strength of the braking force due to the loss of vacuum strength associated with higher altitudes. In this embodiment, the second lever end 203 of the lever arm 200 includes an adjustable leverage bar receiving portion 211 having a first set of mating teeth 212.

The altitude adjustment assembly 210 further includes an adjustment vacuum cylinder 213 firmly attached to the lever arm 200, the adjustment vacuum cylinder 213 having an adjustment vacuum chamber 214, the adjustment vacuum chamber 214 communicating with the vacuum conduit network 50 at a vacuum end 215 and communicating with the atmosphere at an atmosphere end 216. An adjustment plunger 217 slidably engages the adjustment vacuum chamber 214 and separating the vacuum end 215 from the atmosphere end 216 in an airtight fashion. An adjustable leverage bar 218 is attached to the adjustment plunger 217 at one end and is positioned adjacent to the lever arm 200. The adjustable leverage bar 218 has the plurality of attachment points 205, described above, preferably a plurality of adjustment holes running the length of the adjustable leverage bar 218. The adjustable leverage bar 218 also includes a second set of mating teeth 219 adapted to engage the first set of mating teeth 212. A means for biasing 220 the adjustable leverage bar 218 against the vacuum force of the adjustment vacuum cylinder 213 and functionally positioning the adjustable leverage bar 218 such that the plurality of attachment points 205 are longitudinally spaced along the second lever end 203 and the second set of mating teeth 219 are positioned adjacent to the first set of mating teeth 212, the second set of mating teeth 219 not mating with the first set of mating teeth 212 until the vacuum actuated servo mechanism 90 actuates the plunger 100 causing the lever arm 200 to rotate about the pivot point 202. The biasing means 220 is preferably an adjustment spring engaging the adjustable leverage bar 218 to the lever arm 200, preferably through an adjustment cable 221 positioned around an adjustment pulley 222 rotatably mounted on the second lever end 203. The altitude adjustment assembly 210 is attached to the brake pedal 40 with the cable 132 through the cable shield tube 148 as described in the first embodiment described above.

Linear Motor

Figure 11:
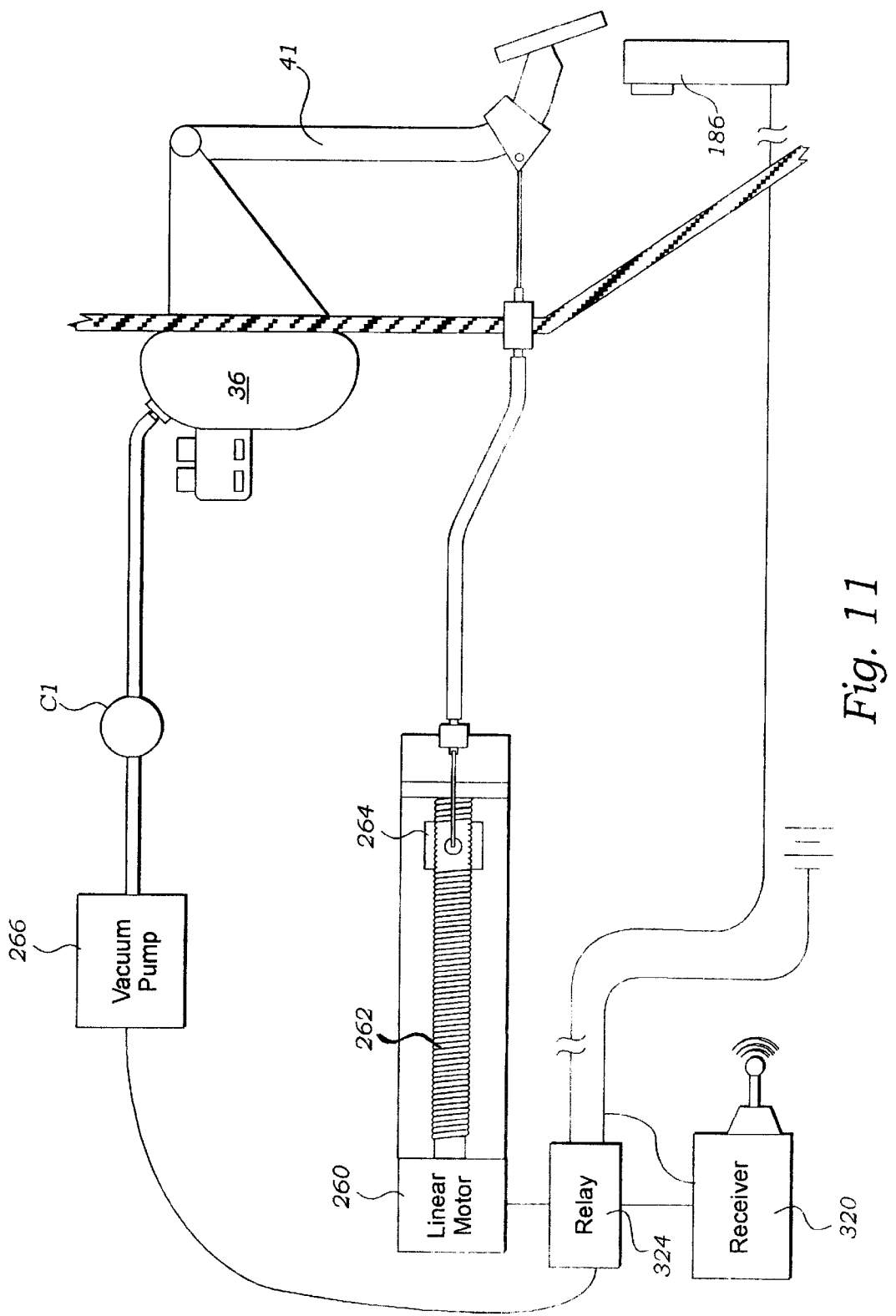
FIG. 11 is a side elevational view of another alternative embodiment of the present invention in which the brake actuator is a linear motor mounted within the engine compartment of the vehicle.

In another embodiment, as shown in FIG. 11, the brake actuator 85 is a linear motor 260 operatively connected to the cable 132. The linear motor 260 includes a drive screw 262 operatively and rotatably mounted on the linear motor 260, and a drive nut 264 threadedly engaged on the drive screw 262. The cable 132 is attached to the drive screw 262. The linear motor 260 is then used to rotate the drive screw 262, thereby moving the drive nut 264 up or down the drive screw 262, thereby actuating the cable 132.

Electronic Control Circuit

In a first embodiment, shown in FIGS. 1, 4, 5, and 7, the electronic control means includes an electronic control circuit 170A that controls the actuation of the vacuum control means 110. The electronic control circuit 170A preferably connects the first and second solenoid switches 114A and 114B to a power supply 48 through at least one switch, described below. When the user closes the switch and completes the circuit, the electronic control circuit 170A energizes the first and second solenoid switches 114A and 114B, thereby actuating the vacuum actuated servo mechanism 90 and braking the vehicle 30. The specific elements of the electronic control circuit 170A will vary depending upon the specific use that the user has for the braking apparatus 10. By adding several different switches, the user can have many alternative methods of braking the vehicle 30. A preferred embodiment of the invention has several switches and is shown in FIG. 8. This embodiment includes both a towing-vehicle circuit 172 and a towed-vehicle circuit 180, both electronically connected to the first and second solenoid switches 114A and 114B for activating the braking apparatus 10.

The towing-vehicle circuit 172 utilizes the towing-vehicle battery 28 as a power source and provides a circuit between the first and second solenoid switches 114A and 114B and the towing-vehicle's battery 28. The connection can be completed with either of two switches, both dependent upon the first activation of the towing-vehicle ignition switch 174. The first switch is a foot switch 176 that already connects to the towing-vehicle's brake lights 26. When the foot switch 176 is activated, the brake lights 26 are energized and first and second solenoid switches 114A and 114B are activated. This electronic control circuit 170A preferably includes a braking kill switch 178, which is controlled by a switch preferably located on the dashboard of the towing-vehicle 20. A second switch, a dashboard switch 179 capable of energizing the first and second solenoid switches 114A and 114B, provides for push-button braking. Whenever the towing-vehicle ignition switch 174 is turned on and the dashboard switch 179 is pressed, the circuit is completed and the power source is connected to the first and second solenoid switches 114A and 114B, thereby electrifying first and it second solenoid switches 114A and 114B and causing the braking device to brake the towed-vehicle 30.

The preferred electronic control means 170 further includes the towed-vehicle circuit 180. The towed-vehicle circuit 180 utilizes a towed-vehicle battery 48 as a power source and preferably includes both a towed-vehicle ignition switch 182 and an anti-theft kill switch 184. The anti-theft kill switch 184 is preferably positioned to complete the circuit between the towed-vehicle battery 48 and the first and second solenoid switches 114A and 114B upon turning the switch. When the switch is activated and the towed-vehicle ignition switch 182 is turned on, the first and second solenoid switches 114A and 114B are energized. If an unauthorized user turns on the car without turning off the anti-theft kill switch 184, the vehicle's manifold 34 will generate vacuum once the engine is running, and the energized first and second solenoid switches 114A and 114B will direct the vacuum to the vacuum cylinder 90, thereby causing the at least one brake 37 of the vehicle to activate, preventing theft of the vehicle. The towed-vehicle circuit 180 preferably includes a push-button switch 186 in which the user completes the circuit and activates the at least one brake 37 with the push of a button, the button usually being mounted near the steering wheel. This "push button braking" is useful for the handicapped, who often cannot use ordinary foot-actuated braking. This also provides the user with a simple method of testing the invention to make sure it is functioning correctly. The towed-vehicle circuit 180 preferably further includes a monitoring circuit (not shown) that electronically connects the brake light circuit of the towed-vehicle 30 with an indicator light in the towing-vehicle 20. The indicator light is preferably mounted on the dash board and visually alerts the driver that the at least one brake 37 has been applied.

Figure 10:
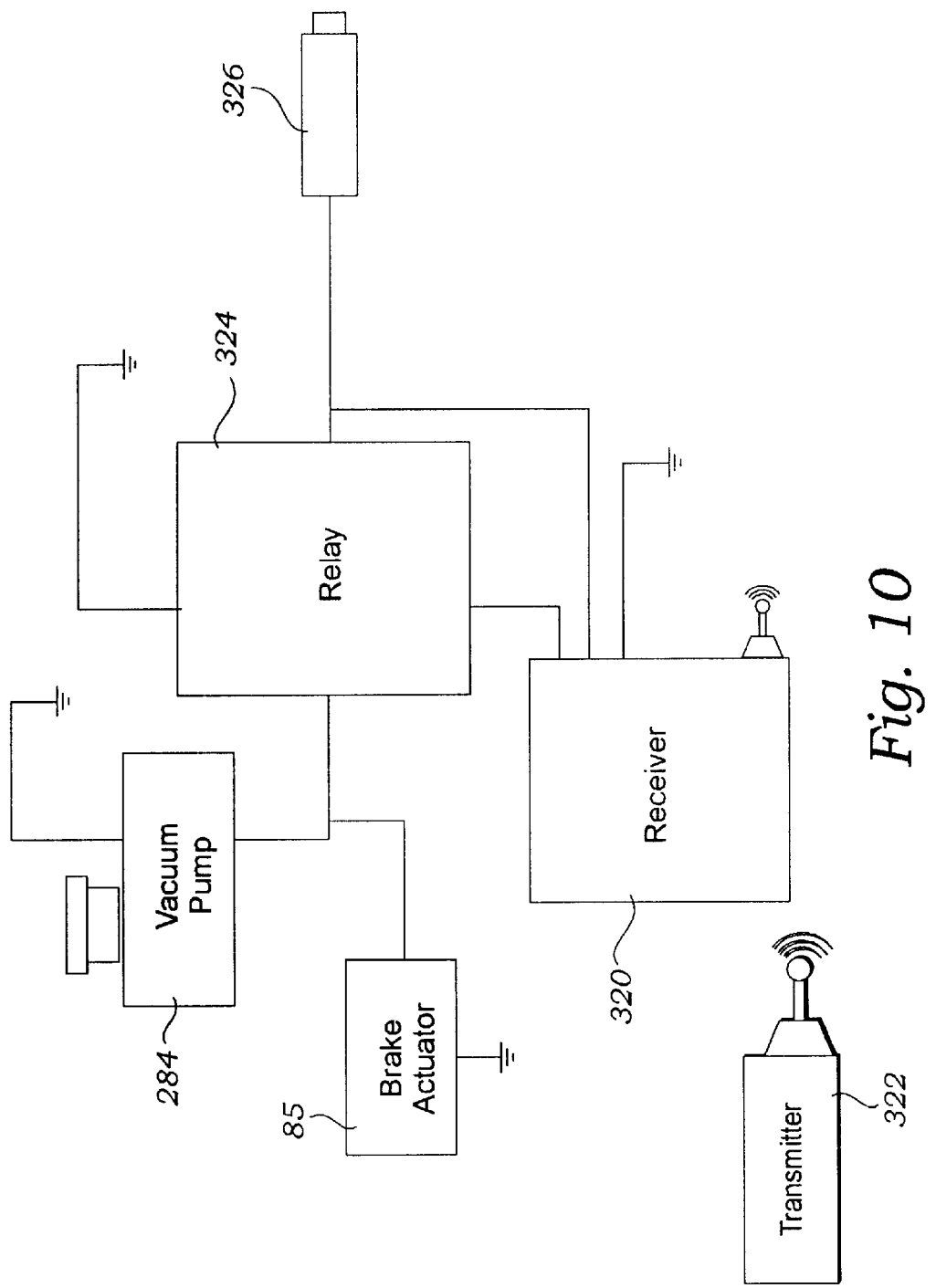
FIG. 10 is an electrical schematic of an alternative embodiment of the electronic control circuit, the electronic control circuit including a transmitter and a receiver for wireless control of the brake actuator through a relay.

In an alternative embodiment, shown in FIGS. 9–11, the electronic control means 170 includes a means for transmitting 322 ("transmitter") a signal to a means for receiving 320 ("receiver") the signal in the vehicle 30. The transmitter 322 can be positioned almost anywhere, including but not limited to the towing-vehicle 20, a hand actuated device operated by a person outside the vehicle 30, or within the vehicle 30, or even remotely from a central office. The receiver 320 is preferably located in proximity to the brake actuator 85, as shown in FIGS. 9 and 11.

As best shown in FIG. 10, the receiver 320 is electrically attached to a lighter plug 326 or other power source. Both the receiver 320 and the lighter plug 326 are operably attached to a relay 324, which is operably attached to both the brake actuator 85 and the vacuum pump 284. When the receiver 320 receives the signal from the transmitter 322, the relay 324 directs power to the vacuum pump 284 and the brake actuator 85. Of course, many alternative embodiments can be devised by those skilled in the art. For example, the vacuum pump 284 can be run continuously, or in response to a vacuum sensor, as is well known in the art, without requiring the vacuum pump 284 to be connected to the relay 324 or receiver 320 at all.

Remote actuation of the braking device 10 enables many innovations in braking. The at least one brake 37 can be actuated with the push of a button, in response to a remote signal to prevent auto theft, or in response to various automatic sensors, including the following: a heat sensor that will automatically deactivate the braking device if the at least one brake 37 overheats; a switch such as is described in Avery et al., U.S. Pat. No. 5,213,396, herein incorporated by reference, that triggers the at least one brake 37 whenever the tow hitch is under stress from braking; a breakaway switch that is activated by a switch that is closed whenever the towed-vehicle 30 breaks away from the towing-vehicle 20; and a remote signaling device that sends a signal to a sensor on the vehicle 30 and causes the at least one brake 37 to activate upon receipt of the signal. Obviously, many different triggering devices can be devised by those skilled in the art. These potential triggering devices, within the capability of those skilled in the art to devise, and the various circuits they require, are all within the scope of this invention and should be considered equivalent.

Towed Vehicle and Towing-Vehicle

In one embodiment shown in FIG. 12, the braking apparatus 10 is installed in a vehicle 30, sometimes referred to as the "towed-vehicle", being towed by a towing-vehicle 20. In this embodiment, the towing-vehicle 20 includes a remote vacuum source 22, preferably a vacuum generator such as a towing-vehicle engine manifold powered by an engine in the towing-vehicle 20. In the case of diesel powered towing-vehicles, the braking apparatus 10 can draw vacuum from other vacuum sources typically already installed in the towing-vehicle 20. The remote vacuum source 22 is attached to a towing-vehicle conduit network 50B, which is connected to both the towing-vehicle vacuum power booster 24 and a towed-vehicle conduit network 50A. A second check valve C2 allows the remote vacuum source 22 to pull a vacuum in the towed-vehicle conduit network 50A in the same fashion as the manifold 34 of the towed-vehicle 30. As described above, the vacuum power booster 36 of the towed-vehicle 30 and the brake actuator 85 receive the vacuum through the towed-vehicle conduit network 50A for functional operation.

It is important to note that, although the invention is configured for use in conjunction with towing, the braking apparatus 10 remains usable when the towed-vehicle 30 is operating under its own power. Not only does this configuration allow a vehicle to retain its full vacuum powered braking ability following the failure of the engine and its manifold 34 vacuum source, this configuration also allows the braking apparatus 10 to function on any vehicle as an anti-theft device or a braking mechanism for the handicapped, and many other special uses can be envisioned for this technology. All that is required to adapt this embodiment of the invention is to develop a signaling mechanism to trigger the brake actuator 85. The vacuum necessary to power the system will be available as long as the vehicle 30 is operating under its own power, the vehicle 30 is towed, or there is vacuum remaining in the vacuum reservoir 64.

In this embodiment, the vacuum actuated servo mechanism 90 is a vacuum cylinder having a plunger 100. The vacuum conduit network 50 includes both a towed-vehicle conduit network 50A and a towing-vehicle conduit network 50B. The towed-vehicle conduit network 50A, shown more clearly in FIG. 1, connects the manifold 34 of the towed-vehicle 30 to the vacuum power booster 36 of the vehicle 30 with three sections of vacuum conduit L1, L2, and L3. As described above, the manifold 34 generates a vacuum which is transmitted to a first check valve C1 through vacuum conduit L1. The vacuum is then transmitted to a three-way conduit connector T1 through vacuum conduit L2. Three-way conduit connector T1 is connected to an inlet port 54 of the vacuum power booster 36 through vacuum conduit L3. Three-way conduit connector T1 is also connected to a four-way conduit connector 56 through vacuum conduit L4. The four-way conduit connector 56 is connected to the following: an outlet port 58 of a vacuum reservoir 64 by vacuum conduit L5, a throttle valve 60 by vacuum conduit L6, and a vacuum gauge 62 by vacuum conduit L7. The vacuum gauge 62 is not essential for operation, but it is included in the best mode of this invention because it allows the user to visually inspect whether the vacuum conduit network 50 is receiving vacuum. The throttle valve 60, sometimes known as a needle valve, allows the user to regulate the amount of vacuum transmitted through the vacuum conduit network 50 to the vacuum control means 110. The throttle valve 60 is important because it allows the at least one brake 37 to be applied in a controlled manner. The throttle valve 60 is connected to the vacuum control means 110 by vacuum conduit L8. When the braking apparatus 10 only has the towed-vehicle conduit network 50A, the apparatus is operable only when the vehicle is operating under its own power. This configuration is useful for braking a vehicle 30 used by a handicapped person who cannot press a traditional brake pedal 40. It is also useful as an anti-theft device, causing the at least one brake 37 to activate if the vehicle 30 is started and a special "kill switch" (not shown) is not deactivated.

The second check valve C2 of the vacuum reservoir 64 is connected to a first ball valve 72 by a vacuum conduit L10. The second check valve C2 allows vacuum from the towing-vehicle 20 to enter the towed-vehicle conduit network 50A when the vehicle is under tow. The first check valve C1 likewise keeps air from leaking into the vacuum conduit network 50 from the manifold 34 of the towed-vehicle 30. The first ball valve 72 provides the user with a mechanism to close the towed-vehicle conduit network 50A when the towing-vehicle conduit network 50B is not attached to a towed-vehicle conduit network 50A. This arrangement allows this preferred embodiment to function similar to the alternative embodiment described above when the invention is not connected to a towing-vehicle 20. The first ball valve 72 is connected to a towed-vehicle bulkhead connector 76 by a vacuum conduit L1. The towed-vehicle bulkhead connector 76 is a rigid, externally threaded adapter that threadedly engages an aperture in the vehicle 30, preferably in the front of the towed-vehicle 30. The towed-vehicle bulkhead connector 76 has a vacuum hose accepting portion 78. The towed-vehicle bulkhead connector 76 provides both a means of connecting the vacuum hose 82 to the vacuum conduit L12 and a conduit for the vacuum through the exterior of the vehicle. The vacuum hose accepting portion 78 of the towed-vehicle bulkhead connector 76 is connected to a similar towing-vehicle bulkhead connector 80 by a length of flexible vacuum hose 82. The towing-vehicle bulkhead connector 80 is preferably mounted on the rear of the towing-vehicle 20.

The vacuum hose 82 is preferably an inelastic plastic tube that is durable enough to withstand use on the road between two vehicles. The towing-vehicle bulkhead connector 80 is it connected to a second ball valve 84 by a vacuum conduit L12. The second ball valve 84 is connected, most preferably, to a three-way conduit connector T3, by a vacuum conduit L13. In the most preferred embodiment, the three-way conduit connector T3 is connected to the remote vacuum source 22 of the towing-vehicle 20 by vacuum conduit L14 and to the towing-vehicle vacuum power booster 24 of the towing-vehicle 20 by vacuum conduit L15. In an alternative embodiment, vacuum conduit L13 is connected to some other vacuum source, such as a portable vacuum canister carried aboard the towing-vehicle 20. The source of this external vacuum source is not important to the novelty of this invention and many other configurations can be devised by those skilled in the art.

Trailer Embodiment

FIG. 13 shows the towing-vehicle 20 towing a trailer 30A. The trailer 30A does not contain a manifold 34 or other local vacuum source because the trailer 30A never operates under its own power. The trailer 30A also does not normally include the brake structure present on an automobile; however, equivalent components can be installed without difficulty. The only practical difference that may arise between these two embodiments is that the vacuum actuated servo mechanism 90 can be more easily modified to directly actuate the vacuum power booster 36 rather than through a more complex connecting means connected to the brake pedal 40; however, since a lever is already highly desirable for adjusting the strength of the braking action and the length of the stroke, the structure used in the towed-vehicle remains the preferred embodiment for the tractor-trailer embodiment.

In Operation

In operation, the braking apparatus 10 operates either when the vehicle 30 is operating under its own power or when it is being towed by a towing-vehicle 20. When the vehicle is operating under its own power, the manifold 34 of the vehicle 30 creates a vacuum throughout the towed-vehicle conduit network 50A. When the vehicle 30 is being towed, vacuum conduit is used to connect the remote vacuum source 22 of the towing-vehicle 20 to the towing-vehicle conduit network 50B, from which the vacuum is transmitted to the towed-vehicle conduit network 50A, creating a vacuum throughout the entire vacuum conduit network 50. While the vacuum control means 110 is in its resting configuration, the vacuum actuated servo mechanism 90 and the connecting means 130 allow the brake pedal 40 to remain in a resting position and the at least one brake 37 of the vehicle remain inactive. In response to a signal from the electronic control means 170, the vacuum control means 110 directs vacuum from the vacuum conduit network 50 into the vacuum actuated servo mechanism 90, causing the vacuum actuated servo mechanism 90 to move from the resting position to the braking position, pulling the brake pedal 40 through the connecting means 130 and thereby applying the at least one brake 37 of the vehicle.

This invention further includes the method of braking a towed-vehicle 30 using the above-described device. The method comprising the steps of providing a towing-vehicle 20 having a remote vacuum source 22; providing a towed-vehicle 30 having an engine compartment 44 and a passenger compartment 46, the engine and passenger compartments 44 and 46 being separated by a firewall 42, the engine compartment 44 having an manifold 34 and at least one brake 37 actuated by a vacuum power booster 36 in response to the movement of a brake pedal 40; providing a vacuum control means 110 operably attached to a vacuum actuated servo mechanism 90; installing the vacuum control means 110 and the vacuum actuated servo mechanism 90 within the engine compartment 44 of the towed-vehicle 30; creating a vacuum conduit network 50 by connecting the remote vacuum source 22 of the towing-vehicle 20 and the manifold 34 of the towed-vehicle 30 to the vacuum power booster 36 of the towed-vehicle 30 and a vacuum control means 110; providing an electronic control means 170; operably connecting the electronic control means 170 to the vacuum control means 110; providing a connecting means 130; drilling a hole through the firewall 42 of the towed-vehicle 30 and inserting the connecting means 130 through the hole; mechanically interconnecting the vacuum actuated servo mechanism 90 to the brake pedal 40 of the towed-vehicle 30 with the connecting means 130; triggering the electronic control means 170 to switch the vacuum control means 110 from a resting position to a braking position. The vacuum control means 110 changes the flow of vacuum from the vacuum conduit network 50, thereby actuating the vacuum actuated servo mechanism 90 such that it moves from a resting position to a braking position, pulling down the brake pedal 40 of the towed-vehicle 30 and causing the at least one brake 37 to decelerate the towed-vehicle 30.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A braking apparatus for a vehicle, the vehicle having a firewall and a brake pedal, the braking apparatus comprising:
   a cable having a first cable end and a second cable end;
   a means for attaching the first cable end of the cable to the brake pedal;
   a brake actuator;
   a means for operatively attaching the second cable end to the brake actuator;
   a first attachment point that is a fixed distance from the brake actuator;
   a cable shield tube adapted to receive the cable through an inner conduit, the cable shield tube having an actuator end and a vehicle end, the actuator end of the cable shield tube being attachable to the first attachment point; and
   a firewall attachment means attachable to the vehicle end of the cable shield tube, the firewall attachment means being adapted for attaching the cable shield tube to the firewall of the vehicle.

2. The braking apparatus of claim 1 further including a means for generating a vacuum, the means for generating a vacuum being operably engaged to a vacuum conduit network, the vacuum conduit network being adapted to operably engage a power boost of the vehicle.

3. The braking apparatus of claim 2 wherein the brake actuator is a vacuum actuated servo mechanism, and wherein the means for controlling the brake actuator includes at least one solenoid valve operably connecting the vacuum actuated servo mechanism to the vacuum conduit network.

4. The braking apparatus of claim 1 wherein the first attachment point is a base plate extending from the brake actuator, the base plate having a first end, actuator end of the cable shield tube being attached to the first end of the base plate.

5. The braking apparatus of claim 1 wherein the firewall attachment means is an anchor bolt adapted to be positioned through the firewall of the vehicle, the anchor bolt having a coaxial conduit that is large enough to enable the cable to be passed through the anchor bolt and the firewall.

6. The braking apparatus of claim 1 wherein the firewall attachment means is an L-bracket adapted to be attached to the firewall of the vehicle, the L-bracket having a locking portion that lockingly engages the vehicle end of the cable shield tube.

7. The braking apparatus of claim 6 wherein the firewall attachment means further includes a pulley operably attached to the L-bracket for supporting the cable in an operable relationship with the brake pedal.

8. The braking apparatus of claim 1 wherein the brake pedal attachment means is a brake pedal clamp adapted to attach to the brake pedal, the brake pedal clamp having a clip hole shaped to receive the first cable end of the cable.

9. A method for braking a vehicle having a firewall and a brake pedal, the method comprising the steps of:
   providing a braking apparatus comprising:
   a cable having a first cable end and a second cable end;
   a brake actuator; and
   a cable shield tube adapted to receive the cable through an inner conduit, the cable shield tube having an actuator end and a vehicle end;
   anchoring the actuator end of the cable shield tube a fixed distance from the brake actuator;
   anchoring the vehicle end of the cable shield tube a fixed distance from the brake pedal;
   attaching the first cable end to the brake pedal; and
   attaching the second cable end to the brake actuator, such that actuation of the brake actuator is transmitted through the cable, thereby actuating the brake pedal.

* * * * *